US007477891B1

(12) United States Patent
Pinault et al.

(10) Patent No.: US 7,477,891 B1
(45) Date of Patent: Jan. 13, 2009

(54) RADIOELECTRIC PROTECTION METHOD FOR A ZONE AGAINST THE USE OF MOBILE TELEPHONES

(75) Inventors: Francis Pinault, Bois-Colombes (FR); Didier Rousseau, Cergy (FR); Alexandre Brandon, La Garenne-Colombes (FR)

(73) Assignee: ALCATEL, Paris (FR)

( * ) Notice: Subject to any disclaimer, the term of this patent is extended or adjusted under 35 U.S.C. 154(b) by 0 days.

(21) Appl. No.: 09/959,749

(22) PCT Filed: Mar. 23, 2000

(86) PCT No.: PCT/FR00/00731

§ 371 (c)(1), (2), (4) Date: Dec. 14, 2001

(87) PCT Pub. No.: WO01/72079

PCT Pub. Date: Sep. 27, 2001

(51) Int. Cl.
*H04Q 7/22* (2006.01)

(52) U.S. Cl. ............ 455/414.1; 455/41.2; 455/413; 455/445

(58) Field of Classification Search ........... 455/414.1, 455/414.2, 414.3, 417, 413, 404.1, 426.1, 455/439, 445, 461, 462, 466, 41.2, 422
See application file for complete search history.

(56) References Cited

U.S. PATENT DOCUMENTS 5,577,101 A * 11/1996 Bohm ................... 455/406
5,581,595 A * 12/1996 Iwashita et al. ........... 455/564
5,594,947 A    1/1997 Grube et al. ............. 455/54.2
5,613,204 A    3/1997 Haberman et al. ........ 455/33.2
5,734,984 A * 3/1998 Reece et al. ............. 455/458
5,854,977 A * 12/1998 Oksanen et al. .......... 455/417
5,920,815 A * 7/1999 Akhavan ................ 455/426.1
5,940,765 A * 8/1999 Haartsen ................. 455/462
5,953,323 A * 9/1999 Haartsen ................. 370/330
6,064,892 A * 5/2000 Miyagawa et al. ........ 455/560
6,122,486 A * 9/2000 Tanaka et al. ............. 455/68
6,246,891 B1 * 6/2001 Isberg et al. ............. 455/574
6,256,503 B1 * 7/2001 Stephens ............... 455/456.6
6,351,643 B1 * 2/2002 Haartsen ................. 455/450
6,445,921 B1 * 9/2002 Bell ..................... 455/426.1
6,493,550 B1 * 12/2002 Raith .................... 455/422.1
6,496,703 B1 * 12/2002 da Silva ................ 455/456.4
6,574,266 B1 * 6/2003 Haartsen ................. 375/133
6,832,093 B1 * 12/2004 Ranta .................. 455/456.4

FOREIGN PATENT DOCUMENTS

EP    0 830 046 A2    3/1998
EP    0 881 851 A1    12/1998

* cited by examiner

*Primary Examiner*—Tony T Nguyen
(74) *Attorney, Agent, or Firm*—Sughrue Mion, PLLC

(57) ABSTRACT

The present invention contains a priority base station (20) placed in a sensitive area (19) to restrict unwanted calls using mobile telephones (5-7). In one example, the base station is a priority base station where a mobile telephone has a preference for the type of base station that it represents. The priority base station then exclusively manages communication with the mobile telephones to neutralize their sending-receiving.

20 Claims, 2 Drawing Sheets

RADIOELECTRIC PROTECTION METHOD FOR A ZONE AGAINST THE USE OF MOBILE TELEPHONES

BACKGROUND OF THE INVENTION

1. Field of the Invention

The present invention provides a radio protection method essentially usable in the field of mobile telephony. The object of the invention is to prevent mobile telephones from ringing or being used for calls in sensitive public areas, in particular theaters, cinemas, lecture halls.

2. Description of the Related Art

The systems currently available in university and other auditoriums to prevent mobile telephone use are somewhat simplistic. They are essentially jammers or transmitters that send simple instructions to the mobile telephones, for example instructions to disable the ringer. The jammers transmit jamming signals with a non-negligible power at random and on all frequencies in a range. These jamming signals are superposed on signaling or speech signals addressed to mobile telephones situated in the environment of the jammers. The mobile telephones are incapable of interpreting the signals resulting from such superposition: calls are disconnected.

Such systems have the disadvantage that there is no effective way to limit the areas in which neutralizing noise is broadcast. Consequently some regions that are not to be protected, but which are situated in the vicinity of an area protected in this way, are affected by the broadcast noise. In these areas communication with mobile telephones becomes random or even impossible.

Furthermore, the installation of such jammers is illegal.

Instructions sent to mobile telephones to disable the ringer do not prevent call set-up. The simple transmitters must also have universal means of communicating with these terminals, which is difficult to implement. Not all mobile telephones use the infrared technology, for example. It is nevertheless necessary to solve the problem of one person's call bothering many others by neutralizing not only incoming calls, which activate the ringer of a mobile telephone, but also outgoing calls, if a mobile telephone user attempts to communicate with another party.

BRIEF SUMMARY OF THE INVENTION

The invention solves this problem by placing a priority base station in the radio protection area instead of a jammer. Any area, in particular any sensitive area, is normally within the radio coverage of a base station of one or more mobile telephone operators. It is precisely because of this that the problems arise.

The idea of the invention is therefore to install a priority base station covering the sensitive area. The sensitive area will therefore be covered at least twice: by a normal base station of a mobile telephone operator and by the priority base station, the latter having to overcome the constraints of connecting a mobile telephone to a specific operator. The priority base station must be able to communicate with mobile telephones in its coverage area, regardless of their account characteristics. In one embodiment of the invention, the priority base station adopts a mode of call management that neutralizes calls. Incoming calls are no longer connected. In the case of outgoing calls, the mobile telephone receives a message indicating that the network is unavailable.

There are various ways to confer priority on a base station. In one improvement to the basic invention, mobile telephone calls are neutralized more effectively if the mobile telephones communicate with a base station in accordance with the CTS (Cordless Telephone System) standard. The CTS standard makes a distinction between private base stations and public base mobile s. For cost reasons in particular, mobile telephones are fitted with devices that switch them automatically from public use to private use. In practice, in the case of private use, calls are routed at reduced cost via the private base station, acting as a private branch exchange, and a public switched telephone network. The mobile telephones therefore have a hierarchy of use, private use taking priority over public use. In a preferred embodiment a priority base station according to the invention is a station which identifies itself to mobile telephones as a private base station, thereby switching the mode of use of the mobile telephone.

In a second embodiment, the priority base station communicates with mobile telephones in the protection area by means of a Bluetooth short-range radio communication protocol.

A first variant of this priority base station sends mobile telephones in said area a disconnection message in respect of the radio network to which they are connected.

A second variant of the priority base station is connected to the public switched telephone network and manages communication with mobile telephones in said area in a similar manner to the embodiment using the CTS standard.

Thus the invention consists in a method of protecting an area against radio transmission to and from mobile telephones, in which method:
  base stations send incoming calls to mobile telephones,
  mobile telephones send outgoing calls to base stations, and
  a priority base station is placed in the area and neutralizes access to mobile telephones therein, characterized in that the priority base station is able to identify itself to mobile telephones regardless of their account characteristics.

BRIEF DESCRIPTION OF THE DRAWINGS

The invention will be better understood after reading the following description and examining the accompanying drawings. The drawings are provided entirely by way of illustrative and non-limiting example of the invention. In the drawings.

DETAILED DESCRIPTION OF THE INVENTION

Figure 1:
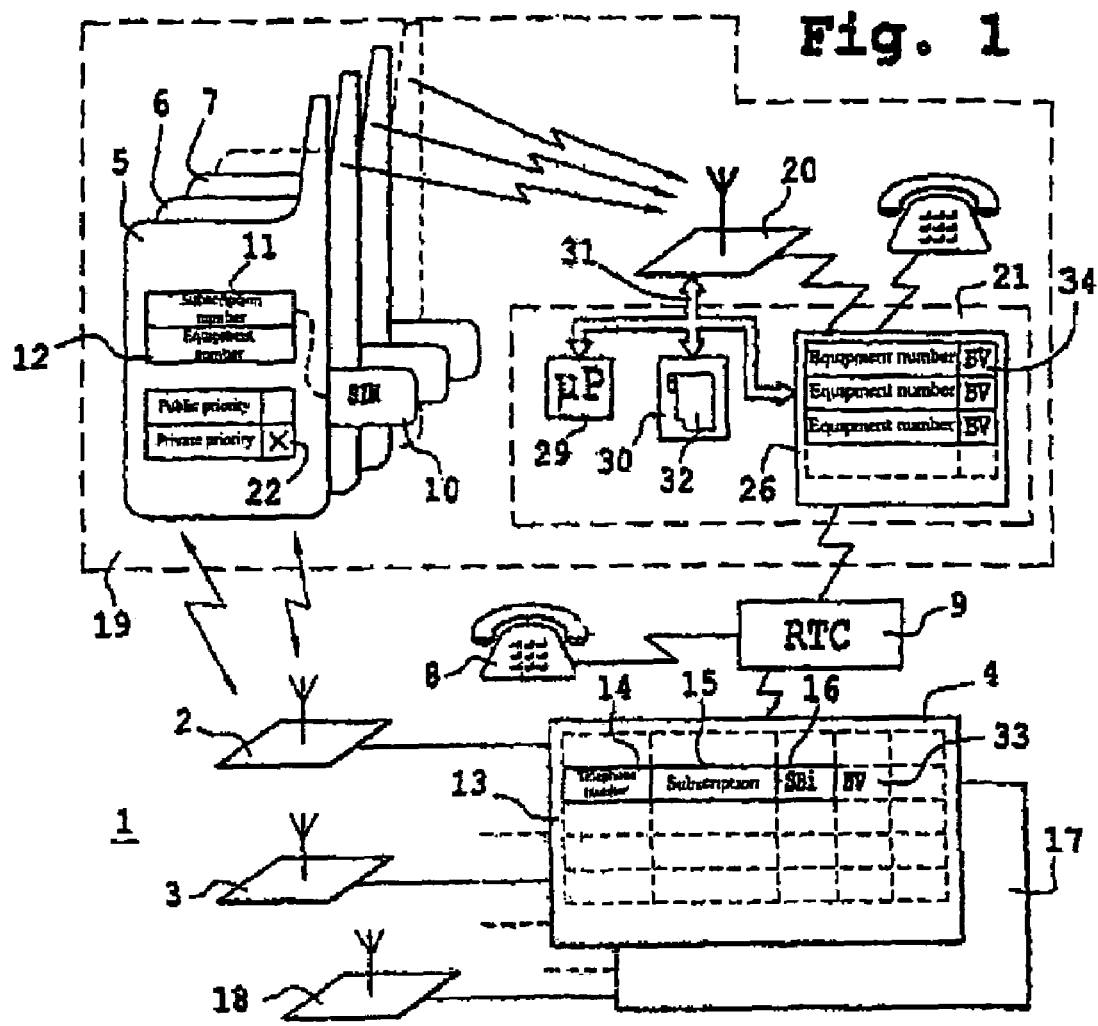
FIG. 1 is a diagrammatic representation of a mobile telephone network and a priority base station and shows a first embodiment of the principle of the invention of using the priority base station to neutralize a sensitive area.

FIG. 1 shows all of the means used to implement the method of the invention. A mobile telephone network 1 consists of a set of base stations 2 and 3 connected to the central circuit 4 of a mobile telephone operator. Via the base stations 2 and 3, mobile telephones 5 to 7 can communicate either with each other or with other telephone users via telephones 8, for example. In practice, a switched telephone network 9 is often inserted into the connection between the mobile telephones 5 to 7 and a telephone 8. The mobile telephones are managed by the network 4 in a manner that is known in the art. In particular it conforms to certain standards. These include the GSM (Global System for Mobile communication) standard and versions thereof in various frequency bands (DCS, PCS, UMTS, etc).

According to the GSM standard, the circuits of each mobile telephone 5 include an SIM (Subscriber Identity Module) circuit 10 which essentially provides information on the account that the owner of the mobile telephone 5 has with the operator managing the central circuits 4. In essence, the SIM circuit 10 contains account reference information 11 that is also referred to as the IMSI (International Mobile Subscriber Information). Other memories of the telephone 5 contain information 12 relating to a serial number or more particularly to an equipment identification number of the telephone 5 also referred to as the IMEI (International Mobile Equipment Identification).

The central circuits 4 essentially include a correspondence table memory 13 for tracking movements of the mobile telephones 5 and addressing to them all calls intended for them. The memory 13, shown diagrammatically here, holds records with several fields. A first field 14 contains a telephone number by means of which a mobile telephone can be contacted. A second field 15 corresponds to the characteristics of the account of the owner of the mobile telephone. In practice, the field 15 of a record contains information that corresponds to that stored in the SIM circuit 10. The memory 13 includes a third field 16 in which it continuously updates the name of the base station or stations through which the mobile telephone 5 can be contacted.

The above means are organized and the memory 13 is updated in the following manner. When a telephone 5 is switched on, it transmits the characteristics 11 of its account to the central circuits 4 via a base station, for example the base station 2. In this case the central circuits 4 complete the corresponding record from the table 13 by entering against the fields 14 and 15 (which are indissociable from each other), in the field 16 by which the mobile telephone signaled its entry into service, the references of a base station SBi, here the station 2. This is simply achieved because the circuits 4 have received the characteristics 11 and can look up the record that corresponds to them. If a party using a telephone 8 wishes to contact the owner of the telephone 5, he dials the telephone number assigned to the latter. The central circuits 4 can look up in the table 13, against the telephone number in the field 14, the name of the base station SBi through which the telephone 5 can be contacted, in the field 16. The circuits 4 then activate the base station SBi, which transmits the incoming call. In practice it causes the ringer of the telephone 5 to ring (or alerts it in any other way).

It is possible for a plurality of mobile telephone operators to cover the same regions. For example, central circuits 17 of a second mobile telephone operator with base stations 18 cover the same areas as the base stations 2 and 3. When it is switched on, a telephone 5 can be validly registered and validly have a field 16 completed only in the central circuits 4 of the operator with whom its owner has an account. For example, the circuits 17 do not recognize account characteristics for the circuits 4.

A private base station 20 is installed in a sensitive field 19, represented schematically by a parallelepiped-shaped space shown in dashed outline. The station 20 communicates with private switching circuits 21. The private base station 20 is either a domestic base station for use in the home or a professional base station for use in the context of a business. To simplify the explanation, the base station 20 communicates with the telephone 5 in the same way as the base station 2 would have done previously.

However, the private nature of this base station is represented concretely by prior recognition of the telephone 5 by the circuits 21. This prior recognition is effected, for example once and for all, when the station 20 is installed or when a new telephone 5 is purchased. During this recognition process, a telephone 5 approaches a base station 20 and a specific interrogation process is started in the circuits 21. During this specific interrogation process, the telephone 5 sends its equipment number information 12 to the circuits 21. Communication continues by acceptance and storage in the circuits 21 of an equipment number record corresponding to the device 5.

For subsequent calls, in a normal prior art mode, the subscription information in the circuits 21 is not verified. The account characteristics are managed by the operator of the circuit 4 and not by the proprietor of the circuits 21. However, to prevent the network of the station 20 accepting any mobile telephone, a test is performed to verify that the equipment number 12 is stored in the circuits 21.

This being so, when the telephone 5 arrives in the environment covered by the base station 2, it transmits to the base station 2 both its account number and its equipment number. The circuits 4 register it using essentially the account number information. On the other hand, when the telephone 5 arrives in the environment of the base station 20, the circuits 21 register it, essentially by means of the equipment number that was previously recognized during the phase described above. If the telephone 5 does not have an account number corresponding to a service managed by the operator of the circuits 4, the base station 2 ignores it: the telephone cannot communicate with it. Similarly, if the telephone 5 has not previously been recognized by the base station 20 and the circuits 21, they ignore it.

In accordance with the invention, the area 19 is protected by a priority base station.

In a first embodiment, the priority base station is a private base station 20 conforming to the CTS (Cordless Telephone System) standard. This embodiment is particularly beneficial because, under the CTS standard, the telephone 5 can function either via a private base station 20 or via a public base station 2 (that belonging to the operator of the circuits 4). In this case, the protocols for communication with the base stations are substantially the same. The CTS standard is an add-on to the GSM standard. In particular, send frequency management, time slot synchronization and, generally speaking, all aspects of call set-up organization are very similar. Mobile telephones that conform to this standard also include circuits for assigning priority to one network rather than another. To this end they hold in their memories an indication 22 for imposing private use (or on the contrary public use) as the priority use.

Under the CTS standard, when the base station 20 identifies itself to a telephone 5, it sends it an indication that it is a private base station at the same time as it sends it a message accepting it. Acceptance proceeds in the following manner. When the telephone 5 is communicating with the base station 2, the telephone 5 sends regularly, at the latest every 2 seconds, signalling messages indicating the references of the base stations with which it can enter into communication. The base station 20, which covers the same area, picks up these messages, of course. On the one hand, it recognizes itself as one of the base stations that can enter into communication with the telephone 5. On the other hand, it can recognize the equipment number of the telephone 5 in a stored list. Where appropriate, it sends the telephone 5 an invitation to connect, since the telephone 5 has been recognized by comparing the equipment number available in area 12 to an equipment number stored in the circuits 21.

In application of the priority indicated by the information 22, the telephone 5 switches to use of the private base station. This prior art mode of operation enables the user to reduce his call costs, of course. The circuits 21 of the base station 20 are connected directly to the switched telephone network 9, enabling the telephone 5 to enjoy a cheaper tariff than that which normally applies to mobile telephony.

In a second embodiment, the priority base station is a private base station 20 able to communication with mobile telephones in the area that it covers using a Bluetooth short-range radio communication protocol.

The Bluetooth standard covers a wireless technology operating in the 2.4 GHz frequency range with digital bit rates up to 721 kbit/s. According to the Bluetooth standard, a communication space is defined around a master station and the devices, such as mobile telephones, have a slave role relative to the master station, to which they synchronize.

In this embodiment, the priority base station 20 is characterized as said master station.

Likewise, in the aforementioned CTS embodiment, the base station 20 is connected directly to the switched telephone network 9 and identifies itself to a telephone 5 as a private base station.

The mobile telephone that conform to this standard have in their memories an indication 22 for imposing private use as the base use.

The invention uses this kind of architecture (CTS, Bluetooth or any other equivalent system) for radio protection of the area 19. To this end, a private base station 20 and circuits 21 for managing the private base station are disposed in the area 19. However, the circuits 21 are modified compared to their prior art version to provide effective protection against the nuisance of unwanted telephone calls.

Figure 2A:
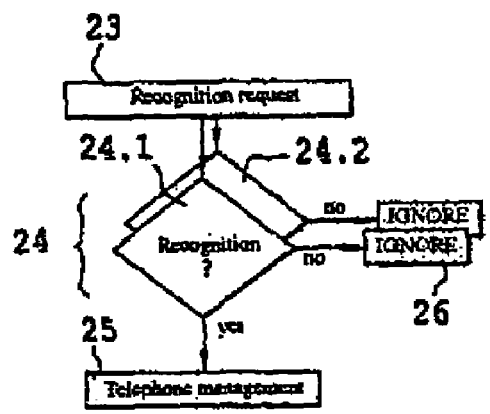
FIGS. 2a and 2b constitute a comparative representation of recognition steps of a conventional method and a method according to the invention, respectively, and of management of a telephone call by a base station.

FIG. 2a shows diagrammatically the entry into communication of a telephone 5 with a public base station 2 or a private base station 20, which essentially involves a recognition request 23 sent either by the base station or by the mobile telephone. The recognition request 23 is followed by a test 24 for recognition of the mobile telephone by the base station. If the base station is a public base station, a test 24.1 consists of finding in the memory 13 a field 15 containing the same information as the account number information 11. If the base station is a private base station, a test 24.2 consists of determining if an equipment number 12 corresponding to that of the device 5 has been previously stored in the memory of the circuits 21. In either case, in the event of a successful search result, step 24 is followed by a step 25 of managing the call in a manner that is known in the art. If recognition does not result, the base stations simply ignore mobile telephones that have not been recognized (operation 26).

Figure 2B:
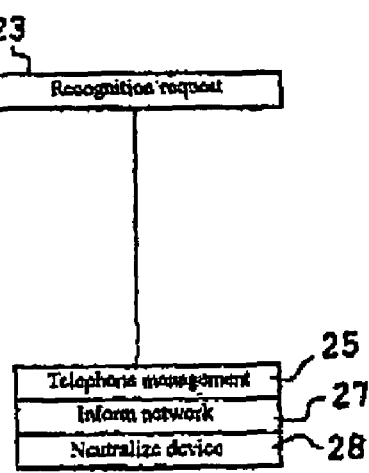

In accordance with the invention, the recognition request step 23 is followed directly by the telephone management step 25 (see FIG. 2b). The recognition tests have been eliminated. In other words, the base station 20 of the invention that has detected the presence in its environment of a telephone 5 that it has not previously recognized would not normally have had to send an acceptance message to the telephone 5 to inform it that it was going to manage it. In accordance with the invention, and merely because the mobile telephone is detected by the base station 20, the latter stores in its memory 26 a record corresponding to the equipment number 12 of the telephone 5. It then automatically considers that equipment number to be one that it knows. The station 20 and the circuits 21 then send to the device 5 an acceptance message to inform it that it has been accepted into the network managed by the base station 20. As a function of the presence of the information 22 in the private priority area, the telephone 25 switches from using a public base station 2 to using a private base station 20.

With the private base station 20 and the circuits 21 for managing it, it is then possible to carry out two main operations to protect the area 19. Firstly, by means of an operation 27, the network of the operator of the circuits 4 is informed that the telephone 5 is now under the control of the base station 20. Secondly, and essentially in the context of the invention, an operation 28 neutralizes incoming calls to the telephone 5 and outgoing calls sent by the telephone 5.

For example, when the telephone 5 switches stations, it informs the base station 2 that it is abandoning the latter's coverage in favour of the coverage of the base station 20. In this case the information in area 16 of the circuits 4 is modified so that it corresponds to the indications relating to the base station 20. In practice, if a telephone 8 attempts to contact the telephone 5, the switched telephone network 9 transmits the call request to the circuits 4. The references of the base station 20 and its connection circuits 21 are present in the memory 13 in the area 16 and the network 9 is therefore again invoked by the circuits 4 to reach the circuits 21, also connected to the switched telephone network 9. Under these conditions, instead of being capable of being transmitted by the base station 2, an incoming call is capable of being transmitted by the base station 20.

The priority base station of the invention includes in the circuits 21, in addition to the memory 26, a processor 29 and a program memory 30 connected by a bus 31. A program 32 stored in the program memory 30 implements the network information and area protection operations 27 and 28. As an alternative to this, if on abandoning the base station 2 the telephone 5 has not informed the circuits 4 of its operator of that fact, this can be effected by the program 32, which has a corresponding message sent to the operator (via the network 19). It is even possible for the operator 4 not to be informed at all. In this case, everything can continue as if the base station 2 were still managing the telephone 5. However, if it attempts to alert the telephone 5 to the arrival of an incoming call, the telephone 5, which is in fact being managed by the base station 20, is then operating in accordance with a frequency and time frame synchronization plan such that there is no possibility of it being able to pick up information intended for it relating to the arrival of an incoming call.

On the other hand, if the operator of the circuits 4 has been alerted, incoming calls are routed via the circuits 21. In this case the program 32 implementing a neutralization function does not route the call that is intended for it to the telephone 5. In this case, and in the previous case, either the circuits 21 or the circuits 4 can send a failure message of various kinds to the party that sent the call. A first type of message that can be sent back to the caller is a message to the effect that the called party is unavailable, or even a message to the effect that the line is busy. The message that is sent is preferably a message that provides communication with a voicemail service. The voicemail service can be implemented either in the circuits 4 or in the circuits 21. In either case, a respective voicemail box 33 or 34 is associated with a record corresponding to an account number or an equipment number. If a voicemail box 33 were used, the neutralization 28 would be effected by sending information from the circuits 21 to the circuits 4 via the program 32 to the effect that the mobile telephone is switched off. In this case switching to the voicemail box 33 would be effected automatically by the operator of the circuits 4.

As an alternative to this, the circuits 21 will have in memory, against the record of each device, a memory area forming a voicemail box 34 for recording messages intended for a telephone 5. When the owner of the telephone 5 has left the area 19, his telephone will be incapable of signalling itself to the station 20, which therefore loses its connection with the telephone 5. At this time, the station 20 and the circuits 21 send a call to the telephone 5 via the network 9 in order to send it the stored messages. As an alternative to this, when it reconnects to the base station 2, or to another base station, the telephone 5 is informed of the messages that were saved in its voicemail box 33 while it was in the coverage of the station 20.

As an alternative to this, the station 20 and the circuits 21 inform the collar that the owner of the telephone 5 is in a sensitive area 19, in which his mobile telephone is neutralized, but that he will be contactable again at the end of the performance, for example from a particular time. In this case the caller is sent information on the nature and/or the conditions of call neutralization.

Neutralization is much simpler for outgoing calls. On each outgoing call attempt, the base station 20 sends to a mobile telephone that is attempting to connect to the network a message to the effect that the network is unavailable. The telephone 5 is unable to communicate via any base station other than the base station 20, since it is naturally connected with the latter since it is the priority base station chosen by the area 22. The message sent to the telephone 5 can be a voice message or an SMS message whose content is displayed on the screen of the telephone 5.

This mode of operation need not be immutable. In the context of a theatre in particular, the base station 20 can operate as just described only during a performance. It is then necessary to manage what happens at the end of the performance. In this case, when the performance ends, the base station 20 and the circuits 21 can send a message to the telephone 5 informing it that the base station is about to close down and prompting it to search for another base station. A message of this type is already known in the art. It is a handover message. The special feature here is that the base station 20 abandons the connection to the telephone 5 without the agreement of a receiver base station 2. In this case the mobile telephone will search all possible base stations, and not only private base stations, to find a base station to which it can connect. It will then naturally come under the control of the base station 2, which also covers the area 19.

Rather than have a private base station 20, it is possible to install in each area 19 an additional base station that will become the priority base station and can supplant another base station 2 of a network. In this case, the priority base station will be a public base station adapted to identify itself to all mobile telephones in its coverage. It will be declared under a universal priority network name, such as PLMN (Public Land Mobile Network). It will include means for communicating with any mobile telephone, regardless of the public network to which it is connected, thanks in particular to roaming agreements between the various public networks.

It will be placed in the area 19, for example in the auditorium.

The priority base station will include means for indicating its priority status to mobile telephones in its coverage area so that the mobile telephones switch automatically to using the priority base station. For example, it will be recognized by virtue of its transmit power as the best solution for all mobile telephones present in the area 19. In this case, the circuits 4 will give preference to choosing the additional base station for managing all mobile telephones that are under its control.

In this case, the concept of priority will result from improved quality of communication with the mobile telephones. Because of this, each time that a mobile telephone enters the environment of the priority base station, there will be a handover from the base station 2 to the priority base station. An operation similar to that described for the circuits 21 and associated with the priority base station will be effected in the circuits 4 of the operator. A program like the program 32 will neutralize the calls, at least during the performance.

In another embodiment of the invention, the priority base station is an equipment unit 20' able to communication with mobile telephones situated in its coverage by means of a Bluetooth short-range radio communication protocol. In this way mobile telephones 5 situated in its coverage see the equipment unit 20' as a Bluetooth accessory.

The equipment unit 20' includes means for sending to mobile telephones 5 situated in its coverage a disconnection message in respect of the radio network to which said mobile telephones 5 are connected.

In one particular embodiment, the message M can be sent periodically by the equipment unit 20'.

Figure 3:
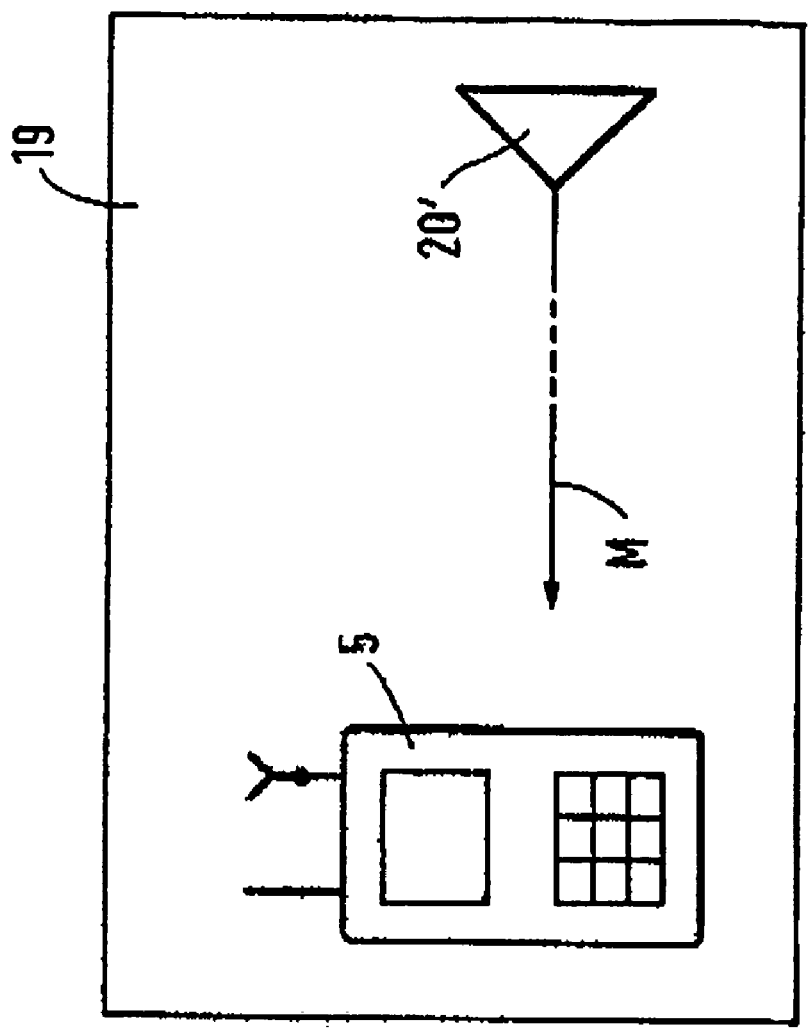
FIG. 3 shows a second embodiment of the principle of the invention of a priority base station neutralizing a sensitive area.

Referring to FIG. 3, the equipment unit 20' sends the message M to the mobile telephones 5, which transmit it as a message I to the respective base stations 2, 3 to which they are connected, which then send back to them a disconnection instruction D.

This method is transparent for the user. Also, as soon as the mobile telephone 5 leaves said coverage, it will attempt again to connect to a base station 2, 3 of the radio network.

The invention claimed is:

1. A method of protecting an area against radio transmission to and from mobile telephones, in which method:
    base stations send incoming calls to mobile telephones,
    mobile telephones send outgoing calls to base stations, and
    a priority base station is placed in the area and neutralizes access to mobile telephones therein,
    characterized in that the priority base station is able to identify itself to mobile telephones regardless of their account characteristics.

2. A method according to claim 1, characterized in that:
    the mobile telephones send and receive in accordance with a particular protocol,
    in that particular protocol, to send calls to and receive calls from a mobile telephone, a base station recognizes a characteristic of that mobile telephone indicating that it belongs to a mobile telephone network to which that base station belongs, and
    in the priority base station, the results of said recognition are set aside and the call with the mobile telephone is managed in all cases.

3. The method according to claim 2, characterized in that:
    the protocol is a CTS protocol that accommodates public base stations and private base stations,
    the characteristic is recognized in a public base station,
    an acceptance characteristic is recognized in a private base station, and
    in a priority base station, the results of said recognition are set aside and the call with the mobile telephone is managed in all cases.

4. A method according to claim 1, characterized in that the priority base station communicates with mobile telephones that are in said area by means of a Bluetooth short-range radio communication protocol.

5. A method according to claim 4, characterized in that the priority base station sends to mobile telephones in said area a disconnection message in respect of the radio network to which they are connected.

6. A method according to claim 4, characterized in that the priority base station is connected to the switched public network and manages communication with mobile telephones in said area.

7. A method according to claim 3, characterized in that
the priority base station sends the mobile telephone a message indicating its private base station status, and
the mobile telephone interprets said message and switches automatically to use of said private base station.

8. A method according to claim 1, characterized in that, for neutralizing calls, use of the mobile telephone is switched from a public mode to a private mode as a function of a priority stored in the mobile telephone.

9. A method according to claim 2, characterized in that the priority base station is a public base station able to identify itself to all mobile telephones within its coverage, regardless of the public network to which they are connected, the priority base station being adapted to manage communication with said mobile telephones.

10. A method according to claim 9, characterized in that the priority base station includes means for indicating its priority status to said mobile telephones so that the mobile telephones switch automatically to use of said priority base station.

11. A method according to claim 1, characterized in that, to neutralize outgoing calls, an unavailability message is sent.

12. A method according to claim 1, characterized in that, to neutralize incoming calls, they are transferred to a voicemail service.

13. A method according to claim 12, characterized in that
an up-to-date list is maintained of mobile telephones managed by the priority base station,
incoming messages are stored in a voicemail memory, and
incoming messages concerning them stored while the mobile telephones were in the coverage of the priority base station are transmitted to them when they are no longer in said coverage.

14. A method according to claim 13, characterized in that the messages are stored in a voicemail memory of the priority base station.

15. A method according to claim 1, characterized in that, to neutralize calls, information on the nature and/or the conditions of neutralization is sent to an absent party.

16. A method of protecting an area against radio transmission to and from mobile telephones, the method comprising:
detecting at least one of an incoming call to a mobile telephone located within an area to be protected and an outgoing call from said mobile telephone made from within said area, wherein said detecting step is performed by a priority base station placed within said area to be protected; and
neutralizing communication access to said mobile telephone within said area to be protected during said at least one of said incoming call and said outgoing call, wherein said neutralizing step is performed by said priority base station, and wherein said neutralizing step is performed regardless of account characteristics associated with said mobile telephone.

17. A method according to claim 16, characterized in that:
the mobile telephones send and receive in accordance with a particular protocol,
in that particular protocol, to send calls to and receive calls from a mobile telephone, a base station recognizes a characteristic of that mobile telephone indicating that it belongs to a mobile telephone network to which that base station belongs, and
in the priority base station, the results of said recognition are set aside and the call with the mobile telephone is managed in all cases.

18. The method according to claim 17, characterized in that:
the protocol is a CTS protocol that accommodates public base stations and private base stations,
the characteristic is recognized in a public base station,
an acceptance characteristic is recognized in a private base station, and
in a priority base station, the results of said recognition are set aside and the call with the mobile telephone is managed in all cases.

19. A method according to claim 16, characterized in that the priority base station communicates with mobile telephones that are in said area by means of a Bluetooth short-range radio communication protocol.

20. A method according to claim 16, characterized in that, to neutralize calls, information on the nature and/or the conditions of neutralization is sent to an absent party.

* * * * *